United States Patent [19]

Fletcher

[11] Patent Number: 5,041,241

[45] Date of Patent: Aug. 20, 1991

[54] CORROSION-INHIBITING COMPOSITION

[75] Inventor: Timothy E. Fletcher, Worms, Fed. Rep. of Germany

[73] Assignee: The British Petroleum Company, p.l.c., London, England

[21] Appl. No.: 260,162

[22] Filed: Oct. 20, 1988

[30] Foreign Application Priority Data

Nov. 7, 1987 [GB] United Kingdom ............... 8726157

[51] Int. Cl.$^5$ .................. C23F 11/00; C23F 15/00
[52] U.S. Cl. ................... 252/387; 106/14.21; 106/14.44
[58] Field of Search ............ 106/14.21, 14.44; 252/387

[56] References Cited

U.S. PATENT DOCUMENTS

| 4,144,074 | 3/1979 | Itoh et al. | 106/14.21 |
|---|---|---|---|
| 4,225,352 | 9/1980 | Makino et al. | 252/387 |
| 4,271,061 | 6/1981 | Suzuki et al. | 523/443 |
| 4,405,493 | 9/1983 | Pippard | 252/387 |
| 4,419,137 | 12/1983 | Coyless et al. | 106/14.39 |
| 4,459,155 | 7/1984 | Coyless | 106/14.21 |
| 4,474,607 | 10/1984 | Goldie et al. | 106/14.39 |
| 4,479,824 | 10/1984 | Schutt | 106/14.21 |
| 4,594,369 | 6/1986 | Othen | 252/387 |
| 4,643,769 | 2/1987 | Othen | 106/1.17 |
| 4,687,595 | 8/1987 | Howes et al. | 252/387 |
| 4,795,492 | 1/1989 | Othen | 106/14.21 |

FOREIGN PATENT DOCUMENTS 0122781 10/1984 European Pat. Off. .
0260961 3/1988 European Pat. Off. .

Primary Examiner—Deborah L. Kyle
Assistant Examiner—Valerie D. Fee
Attorney, Agent, or Firm—Joseph G. Curatolo; Larry W. Evans

[57] ABSTRACT

A corrosion-inhibiting composition comprises a blend of particles of two amorphous silicas; one containing corrosion-inhibiting cations releasable by ion-exchange and the second being substantially free of any corrosion-inhibiting ions. The weight ratio of the cation-containing silica to non ion containing silica is in the range 20:80 to 60:40.

The corrosion-inhibiting composition may be incorporated into liquid media and protective coatings, which are based on film-forming polymers e.g. epoxy resins, vinyl resins, epoxy esters.

The amorphous silica used is preferably of a microporous type. Calcium cations are the preferred corrosion inhibiting cations. The composition is preferable used to inhibit corrosion of aluminium surfaces.

8 Claims, No Drawings

CORROSION-INHIBITING COMPOSITION

This invention relates to corrosion inhibiting compositions, protective coatings and liquid media containing said compositions.

European Patent Specification 0046 057 discloses corrosion inhibiting particles comprising an inorganic oxide, which is silica or alumina, having corrosion inhibiting cations chemically bound to the particles. The cations specifically disclosed are calcium, zinc, cobalt, lead, strontium, lithium, barium and magnesium cations. European Patent Specification 0 089 810 discloses corrosion inhibitors comprising an inorganic oxide having cations of yttrium or cations of one or more metals of the lanthanide group chemically bound to the oxide particles.

The patent specifications referred to above also disclose methods of preparing corrosion inhibitors comprising inorganic oxide particles having corrosion inhibiting cations bound to the surface of the oxide. These methods basically comprise contacting the inorganic oxide with a solution containing the required corrosion inhibiting ions and controlling the pH in order to effect the ion-exchange between the corrosion inhibiting cations and the hydroxyl groups which are present on the surface of the oxide. The cation-exchanged particles may then be washed, milled to a small particle size, if required, and dried.

According to the present invention there is provided a corrosion-inhibiting composition comprising a blend of particles of a first amorphous silica and particles of a second amorphous silica, said first amorphous silica containing corrosion-inhibiting cations releasable by ion-exchange, and said second amorphous silica being substantially free of corrosion-inhibiting ions releasable by ion-exchange wherein the weight ratio of first to second amorphous silica is in the range 20:80 to 60:40.

The composition is suitable for corrosion-inhibition in metals and pretreated galvanized surfaces but is particularly suitable for aluminum and its alloys.

The cation-containing particles may be prepared by an suitable process such as one of the processes described in the above mentioned patent specifications. For example cation-exchanged particles may be prepared by contacting silica particles having surface hydroxyl groups with a solution containing corrosion inhibiting cations and controlling the pH of the mixture in order to effect ion-exchange between the corrosion inhibiting cations and the hydroxyl groups. Alternatively, particles of silica having surface hydroxyl groups may be contacted with an aqueous solution of an alkali metal salt at a pH sufficiently above 7 or the protons of the hydroxyl groups to be replaced by alkali metal cations and thereafter contacting the alkali metal exchanged silica with a solution containing the required corrosion inhibiting cations in order to replace the alkali metal cations with the required corrosion inhibiting cations.

The preferred corrosion-inhibiting cations are calcium, zinc, cobalt, lead, strontium, lithium, barium, magnesium and yttrium cations and cations of the lanthanide metals; particularly preferred are calcium cations.

The silica used for both the cation-containing silica (i.e. said first amorphous silica) and the silica that is substantially free of corrosion inhibiting ions (i.e. said second amorphous silica) is amorphous silica preferably silica gels of acid reaction (i.e. the silica gel gives an acidic pH when slurried in water). Dense crystalline silicas are not suitable because of their very low solubility in water. The amorphous silica is preferably of a microporous type; the pore size is preferably in the range <30A, more preferably in the range 20–25A. Silicas with low oil absorptions are preferred; oil absorption is preferably in the range <0.8 $gg^{-1}$, more preferably in the range 0.4–0.65 $gg^{-1}$.

The relative proportions (by weight) of the first silica to the second silica will be in the range 20:80 to 60:40; preferably in the range 25:75 to 50:50, more preferably in the range 30:70 to 40:60.

The corrosion inhibiting particles may typically contain up to 2.5 millimoles/g of the corrosion inhibiting cation, depending inter alia, on the particular cation and the particular silica used. The lower limit of the amount of the corrosion inhibiting cation may be 0.01 millimoles/g but is preferably 0.05 millimoles/g.

The corrosion inhibiting composition as hereinbefore described may be included in protective coatings and liquid media used for producing such coatings. The present invention includes such protective coatings and liquid media. The protective coatings may be any of the known types of protective coatings based on film-forming polymers or resin. The liquid media may be any of the known types of media used for producing such coatings e.g. paints, varnishes and lacquers. They may in particular be chosen from primer paints based on epoxy resins, vinyl resins and epoxy esters.

The composition may act as a filler for the coating and may be included in amounts of up to 40% wt based on the paint to be applied and up to 80% wt based on the dry film weight. Corrosion inhibiting properties may be imparted to the protective coatings by relatively small amounts of the composition e.g. 10% wt based on the dry film weight, depending on the corrosion inhibiting capacity of the composition.

A metal primer based upon the present invention may typically contain 12% w/w of the composition of which 50% w/w may be the cation-containing particles. Such a primer would have a corrosion inhibiting cation concentration in the dry film of approximately $6 \times 10^{-4}$ to b $1.5 \times 10^{-1}$ millimoles/g.

When used in protective coatings the particles of both first and second silicas should be suitably small so as to remain in suspension in the composition before the application and so as not to substantially affect the ease of application or the smoothness of the dry coating. Suitably the particles are less than 40 microns in diameter, more preferably less than 25 microns. Thus particles, for example having a small particle size can be ion-exchanged. Alternatively, larger particles can be ion-exchanged and then subsequently milled to a smaller size without adverse effect. The use of larger particles does not significantly reduce the total uptake of ions.

The subsequent size reduction is conveniently carried out by wet grinding before drying the particles but grinding dried particles is also suitable.

The invention is illustrated by reference to the following examples. Example 1 (according to the invention) and Comparative Experiments A–D refer to the electrochemical testing of the corrosion rates on an aluminum alloy sample. The aluminum alloy used in each case was BSL 156 pre-treated with chromic acid. The corrosion rates were determined from AC Impedance studies in a 3½% NaCl aerates solution.

Experiment A

An aluminum alloy test coupon (6"×4") was immersed in an aerated aqueous NaCl solution of pH 8.0. The system was allowed to equilibrate for 2 hours and the AC Impedance spectrum obtained. The results are given in Table 1.

Experiment B

An aluminum alloy test coupon was immersed in an aerated aqueous NaCl solution to which had been added 1% wt/vol strontium chromate and its corrosion characteristics measured as described in Experiment A.

Experiment C

Experiment A was repeated using an aluminum test coupon immersed in an aerated aqueous NaCl solution to which had been added 1% w/v silica gel.

Experiment D

Experiment C was repeated using an aluminum test coupon immersed in an aerated aqueous NaCl solution to which had been added 1% w/v calcium-exchanged silica.

Example 1 (according to the invention)

Experiment C was repeated using an aluminum test coupon immersed in an aerated aqueous NaCl solution to which had been added a blend of silica gel (0.5% w/v) and calcium-exchanged silica (0.5% w/v).

The corrosion rates as determined by AC impedance studies are given in Table 1.

Comparative Experiments E-H and Examples 2-4 (according to the invention) refer to the corrosion resistance of aluminum alloy samples (BSL 156) to which an epoxy/polyamide primer paint was applied. The aluminum alloy samples used in each case was pretreated with chromic acid. The primer in all cases was applied as a wet film to give a 15-20 microns thick dry film; this was allowed to cure for 7 days at room temperature and then subjected to 1000 hours salt-spray according to ASTM B-117. The results of the paint testing are given in Table 2. The epoxy/polyamide primer paints in the above experiments were prepared according to the follow formulation details.

All pigment volume concentrations (PVC) were 30% (PVC is defined as the volume concentration of all solids, other than the binder, in the dry coating.) The base formulations were blended with catalyst in the proportions by weight shown. Volume solids of mixed paints were all 32.5%. Formulations are all set out in proportions by weight.

| Experiment | 2-4, G and H | F | E |
|---|---|---|---|
| Epikote 1001X75 | 22.87 | 22.87 | 22.87 |
| MIBK | 14.96 | 14.96 | 14.96 |
| Butanol | 6.08 | 6.08 | 6.08 |
| Xylene | 12.02 | 12.02 | 12.02 |
| MPA | 4.49 | 4.49 | 4.49 |
| Talc 20/M/2 | 10.68 | 10.68 | 18.69 |
| Calcium-exchanged silica Wet ground Cecagel | 11-13* | | |
| Tiona 472 | 7.62 | 7.62 | 19.05 |
| Strontium chromate | | 21.74 | |

*Total volume of calcium-exchanged silica + wet ground cecagel remained constant @ 15% in dry film.

The above ingredients were milled to 15-20 microns and let down with

| Epikote 1001X75 | 6.92 parts by weight |
|---|---|
| MIBK | 1.77 |
| Xylene | 1.66 |
| MPA | 0.53 |
| Byk 300 | 0.10 |
| The catalyst used to cure the above formulations was: | |
| Versamid 115X | 8.25 parts by weight |
| Versamid 140 | 1.93 |
| Xylene | 6.51 |
| Butanol | 8.98 |

The calcium-exchanged silica was prepared according to the method as described in European patent specification 46057 and then subjected to a hydrothermal aging stage according to the method as described in European patent specification 0170356.

Epikote 1001X75 is a solution of epoxy resin in xylene (75% by weight)

Versamid 140 is a reactive polyamide

Versamid 115X is a solution of reactive polyamide in xylene (70% by weight)

Cecagel is a microporous silica gel

Tiona is a titanium dioxide

Byk 300 is a flow agent comprising polyester/polysiloxane copolymer solution

MIBK and MPA are abbreviations for methylisobutylketone and methoxypropyl acetate Epikote, Versamid, Cecagel, Tiona and Byk are all trade names.

TABLE 1

AC Impedance Corrosion Data Treated Aluminium

| Experiments | Environment | pH | Corrosion RAE mpy |
|---|---|---|---|
| A | Baseline 3½% NaCl (aq), Aerated | 8.0 | 5-6 |
| B | Strontium Chromate (1% wt/vol) 3½% NaCl (aq), Aerated | 7.9 | 0.45-0.50 |
| C | Silica Gel (1% wt/vol) 3½% NaCl (aq), Aerated | 7.3 | 3-6.5 |
| D | Calcium-exchanged silica (1% wt/vol) 3½% NaCl (aq), Aerated | 7.5 | 1.5-2.5 |
| 1 | Silica Gel (0.5% wt/vol) + calcium-exchanged silica (0.5% wt/vol) (Invention) 3½% NaCl (aq), Aerated | 8.5 | 0.5-0.6 | pH adjustment made to bring test environments in line with that of baseline
AC Impedance spectra obtained after two hours equilibration

TABLE 2

Epoxy-Polyamide Primer, 1000 Hours Salt-Spray Testing on Aluminium Alloy (BSL 156)

| Expt. | Anti-Corrosion Pigment | Total Level (% vol in dry film) | Scribe Conditions | NCS* | Undercutting mm |
|---|---|---|---|---|---|
| E | Blank | — | 100% Dark Scribe | 20 | 1–3 |
| F | Sr. chromate | 10 | 100% Bright Scribe | 2 | <0.5 |
| G | Calcium-exchanged silica | 15 | 100% Dark Scribe | 21 | 1–3 |
| 2 | Ca silica/silica 1:2 | 15 | 50% Bright Scribe | 5 | ½–1 |
| 3 | Ca silica/silica 2:1 | 15 | 100% Dark Scribe | 17 | ½–3 |
| 4 | Ca silica/silica 1:1 | 15 | 30% Bright Scribe | 7 | ½–1 |
| H | Silica | 15 | 35% Bright Scribe | 8 | ½–1 |

*NCS = Number of Corrosion Spots

I claim:

1. A corrosion-inhibiting composition comprising a blend of particles of a first amorphous silica and particles of a second amorphous silica, said first amorphous silica containing corrosion-inhibiting cations releasable by ion-exchange, and said second amorphous silica being substantially free of corrosion-inhibiting ions releasable by ion-exchange wherein the weight ratio of first to second amorphous silica is in the range 20:80 to 60:40.

2. A corrosion-inhibiting composition as claimed in claim 1 wherein the weight ratio of first to second amorphous silica is in the range 30:70 to 40:60.

3. A corrosion-inhibiting composition as claimed in claim 1 wherein said corrosion-inhibiting cations are chosen from the group consisting of calcium, zinc, cobalt, lead, strontium, lithium, barium and magnesium cations.

4. A corrosion-inhibiting composition as claimed in claim 3 wherein said corrosion inhibiting cations are calcium cations.

5. At corrosion-inhibiting composition as claimed in claim 1 wherein at least one of said first and second amorphous silicas is a silica gel of acid reaction.

6. A corrosion-inhibiting composition as claimed in claim 1 wherein at least one of said first and second amorphous silicas is a microporous silica having an average pore size in the range 20–25 Angstrom units.

7. A corrosion-inhibiting composition as claimed in claim 1 wherein the particles of said first and second amorphous silicas are less than 40 microns in diameter.

8. A corrosion-inhibiting composition as claimed in claim 2 wherein said corrosion-inhibiting cations are chosen from the group consisting of calcium, zinc, cobalt, lead, strontium, lithium, barium and magnesium cations.

* * * * *